W. L. BLAY.
SAWMILL.
APPLICATION FILED MAY 2, 1910.
993,142.
Patented May 23, 1911.
2 SHEETS—SHEET 1.
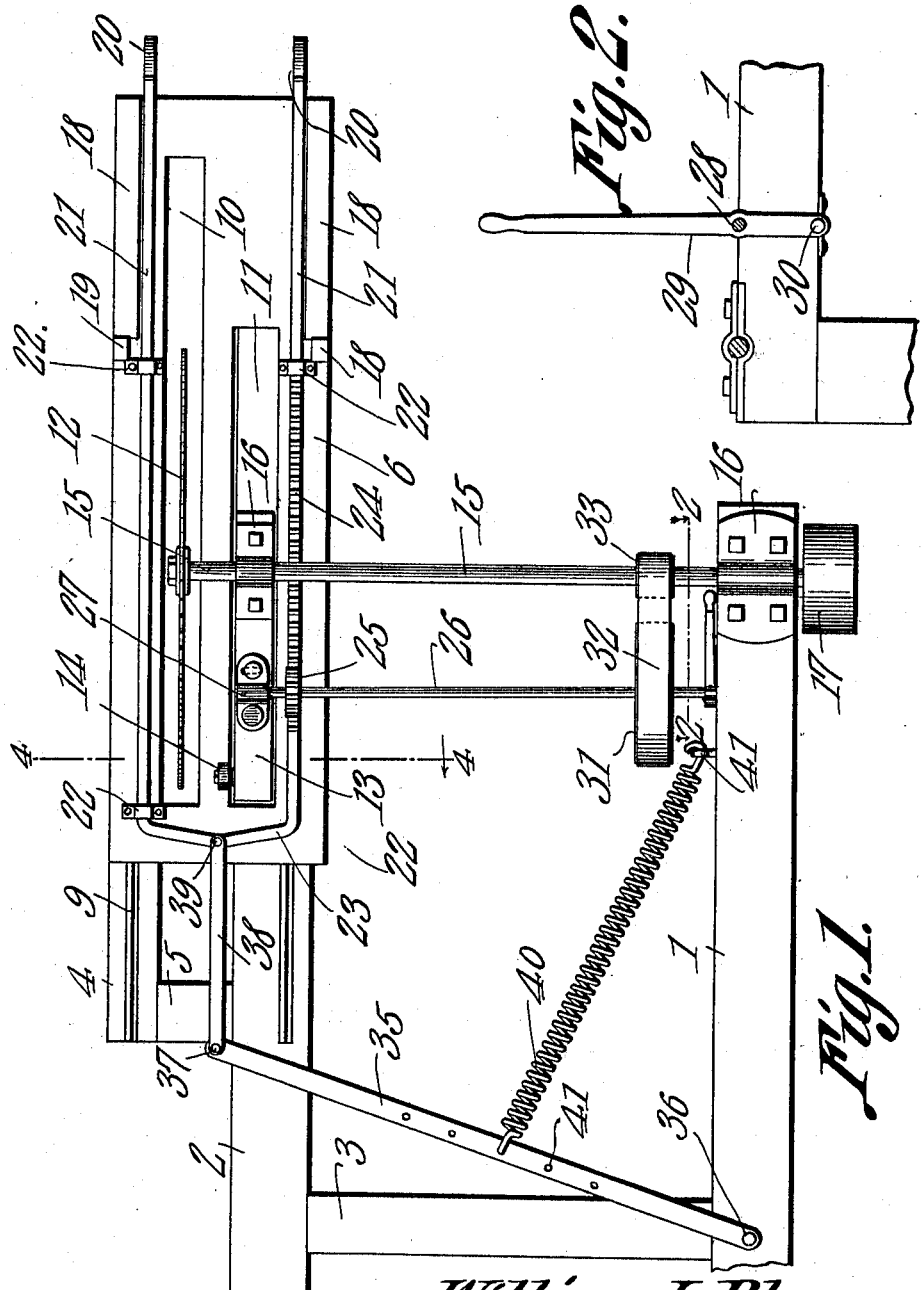

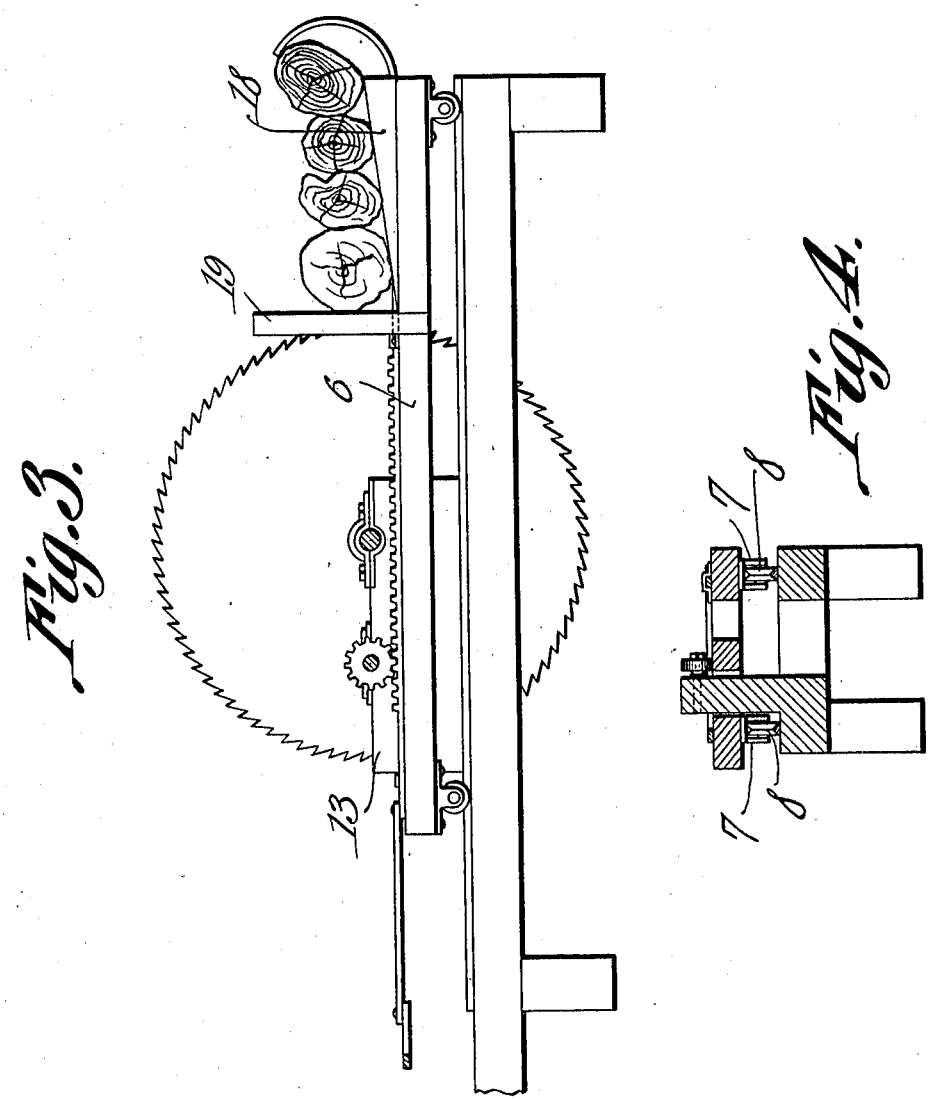

UNITED STATES PATENT OFFICE.

WILLIAM L. BLAY, OF WARRENS, WISCONSIN, ASSIGNOR OF ONE-HALF TO WILLIAM H. MORSE, OF WARRENS, WISCONSIN.

SAWMILL.

993,142.  Specification of Letters Patent.  Patented May 23, 1911.

Application filed May 2, 1910. Serial No. 558,874.

*To all whom it may concern:*

Be it known that I, WILLIAM L. BLAY, a citizen of the United States, residing at Warrens, in the county of Monroe and State of Wisconsin, have invented a new and useful Sawmill, of which the following is a specification.

This invention relates generally to saw mills of the circular type, and particularly to the mechanism for holding and feeding the work to the saw.

The object of the invention is to provide automatic means for first securely holding the work in position and then feeding it to the saw while so held.

Further objects of the invention are generally to improve and simplify the construction of such devices as well as to increase their efficiency in operation.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of the claims without departing from the spirit of the invention.

In the accompanying drawings forming part of this specification:—Figure 1 is a plan view of a saw mill equipped with the improvements of the present invention. Fig. 2 is a vertical section on the line 2—2 of Fig. 1. Fig. 3 is a side elevation, partly in section, of a saw mill constructed in accordance with the present invention. Fig. 4 is a vertical section on the line 4—4 of Fig. 1.

Like reference numerals indicate corresponding parts in the different figures of the drawing.

The framework of the saw mill of the present invention preferably is made up of a pair of parallel main sills 1 and 2 which are connected with each other by means of a cross piece 3. The frame of the machine also includes an auxiliary sill 4 which is parallel with and comparatively near to the sill 2 and is connected therewith by means such as the cross piece 5.

The reference numeral 6 indicates a work carrier or support which is adapted to reciprocate longitudinally of the frame of the device, this reciprocation being accomplished preferably by providing the carrier or work support 6 on its lower surface, as shown in Fig. 4 with brackets or arms 7 in which are journaled rollers 8 preferably formed with V-shaped grooves which engage tracks 9 extending longitudinally of the sills 4 and 2. The work support or carrier 6 is formed with a pair of parallel slots or openings 10 and 11, the opening 10 being preferably longer than the opening 11 and being adapted to receive the circular saw 12. Extending upward through the slot or opening 11 is a block 13 which is secured in any suitable manner at its lower edge to the sill 2 so as to be fixed thereon. The block 13 serves as a guide for the work support or carrier 6. For the purpose of holding the work support or carrier 6 properly in engagement with its tracks 9, a roller or similar device 14 is journaled upon the block 13 and bears against the upper surface of the support or carrier 6. The shaft 15 for the saw blade 12 is journaled in a bearing 16 which is bolted or otherwise suitably secured on the upper surface of the block 13 and said shaft at its opposite end is journaled in a bearing 16 secured to the sill 1. The shaft 15 and blade 12 are rotated or operated preferably by means of a belt wheel 17.

Mounted upon the upper surface of the carrier or support 6 is a plurality of forwardly and downwardly inclined supporting members 18 which cause the work, such as logs and the like, placed thereon, to have a tendency to roll downward toward the saw blade 12 until they are stopped by the vertically extending work holders or standards 19 which project upward from the surface of the carrier 6 at the forward and lowermost ends of the work support 18.

Movably mounted upon the carrier 6 adjacent to the standards or work holders 19 are a plurality of movable work holders 20 which preferably are in the form of hooks as shown in Fig. 3. Each of the curved work holders 20 is provided with a forwardly extending rod 21, the two rods 21 being journaled for longitudinal sliding movement in brackets 22 secured in any suitable manner to the upper surface of the carrier or table 6, the two rods 21 being connected with each other at their forward ends by a cross piece 23 which, when the rods are in their rearmost position as shown in Fig. 1, engages the adjoining brackets 22 as shown.

For the purpose of operating the work holders 20, one of the rods 21 is formed with rack teeth 24 which are in mesh with a pinion 25 fixed upon a shaft 26 journaled at one end in a bearing 27 mounted upon the block 13 and at its other end journaled at 28 in a lever 29 which is fulcrumed at 30 upon the lower surface of the sill 1. The shaft 26 has fixed thereon a belt wheel 31 which, by means of a belt 32 is normally and loosely connected with a belt wheel 33 fixed upon the shaft 15 of the saw blade 12.

The operation of the device as thus far described is as follows: When the saw blade 12 is in operation by means of the belt wheel 17, the logs or other material to be sawed are laid upon the inclined supports 18 so that they can run down against the work holders 19. By throwing the lever 29 forward so as to tighten the belt 32 upon the belt wheels 31 and 33, the shaft 26 receives rotation from the main shaft 15 with the result that the pinion 25 causes a forward sliding movement of the two bars 21 and the two curved work holders 20. The work holders 20 slide forward upon the carrier 6 until the logs resting against the work holders 19 become jammed or caught between the holders 20 and 19 after which the movement of the work holders 20 is transmitted through the logs to the work holders 19 and through said work holders 19 to the carrier or table 6 which is thereby caused to roll forward upon its rollers or supports 8, the result being that the material is severed by the rotary saw blade 12.

The means for restoring the parts to their initial position after the sawing operation has been completed, consists preferably of a lever 35 which is fulcrumed at 36 upon the sill 1 and at its free end is connected at 37 with a link 38 which is secured at its rear end at 39 to the cross piece 23 of the movable work holders 20. A coil spring 40 is secured at one end to an eye 41 mounted upon the sill 1 and at the other end is hooked into any one of a series of perforations or other fastening means 42 formed on the lever 35. By arranging the coil spring 40 in one or the other of the perforations 41 the tension thereof can be readily regulated. When the support 6 and the work carried thereby are moved forward in the manner described by the manipulation of the lever 29 the coil spring 40 is stretched or put under tension, and when the sawing operation has been completed and it is desired to restore the parts to their initial positions the pressure on the hand lever 29 is released so as to permit the belt 32 to run loose, after which the spring 40 acts to cause the work holders 20 and rods 21 to slide backward upon the work holder or carriage 6 until the cross piece 23 thereof engages the forward bracket 22 after which the spring 40 causes the carrier 6 to roll backward to its initial position. The operation can then be repeated.

It will be obvious from the foregoing description that the machine of the present invention is provided with means for automatically clamping the logs in position and then feeding them forward to the saws. It is also obvious that the device is provided with means for automatically restoring all of the parts to initial position.

The saw mill of the present invention is strong, simple, durable and inexpensive in construction as well as thoroughly efficient and easily manipulated in operation.

What is claimed as new is:—

A saw mill having a slidable table, a pair of rods slidable on said table and having their ends bent upwardly to form hooks, stationary work holders on said table, a cross piece connecting the forward ends of said rods, a spring operated lever connected with said cross piece, and means acting on said rods for operating said work holders.

In testimony that I claim the foregoing as my own, I have hereto affixed my signature in the presence of two witnesses.

WILLIAM L. BLAY.

Witnesses:
H. H. HINTON,
E. O. JOHNSON.

---

Copies of this patent may be obtained for five cents each, by addressing the "Commissioner of Patents, Washington, D. C."